US006453849B1

(12) United States Patent
Mosby

(10) Patent No.: US 6,453,849 B1
(45) Date of Patent: Sep. 24, 2002

(54) ANTI-CRIBBING DEVICE

(76) Inventor: Charles Joseph Mosby, 2350 Leamington Rd., Equality, IL (US) 62934

( * ) Notice: Subject to any disclaimer, the term of this patent is extended or adjusted under 35 U.S.C. 154(b) by 0 days.

(21) Appl. No.: 09/732,179

(22) Filed: Dec. 7, 2000

Related U.S. Application Data

(60) Provisional application No. 60/169,565, filed on Dec. 8, 1999.

(51) Int. Cl.[7] .............................................. A01K 15/00
(52) U.S. Cl. ...................................... 119/712; 119/908
(58) Field of Search ............................... 119/712, 719, 119/722, 908

(56) References Cited

U.S. PATENT DOCUMENTS

| 3,687,112 | A |   | 8/1972  | Henderson ..................... 119/29 |
| 4,153,009 | A |   | 5/1979  | Boyle ............................... 119/29 |
| 4,299,048 | A |   | 11/1981 | Bayes .............................. 43/98 |
| 4,465,263 | A |   | 8/1984  | Robbins, Jr. ..................... 256/52 |
| 4,533,120 | A |   | 8/1985  | Ruddock ......................... 256/52 |
| 4,539,937 | A |   | 9/1985  | Workman ....................... 119/29 |
| 4,755,633 | A |   | 7/1988  | Standing ..................... 174/133 R |
| 4,836,504 | A |   | 6/1989  | Fingerson et al. .............. 256/10 |
| 5,343,829 | A |   | 9/1994  | Lookingbill ................. 119/821 |
| 5,460,125 | A |   | 10/1995 | Lookingbill ................. 119/821 |
| 5,722,352 | A |   | 3/1998  | Leatherman ................. 119/822 |
| 5,850,808 | A |   | 12/1998 | Burdick ....................... 119/903 |
| 6,116,192 | A | * | 9/2000  | Hultine et al. ............... 119/719 |
| 6,226,933 | B1 | * | 5/2001  | Nelson et al. |
| 6,314,914 | B1 | * | 11/2001 | Betzen ........................ 119/712 |

FOREIGN PATENT DOCUMENTS

WO     WO 98/20729     *   5/1998   .......... A01K/13/00

* cited by examiner

Primary Examiner—Charles T. Jordan
Assistant Examiner—Kimberly S. Smith
(74) Attorney, Agent, or Firm—Grace J. Fishel

(57) ABSTRACT

An anti-cribbing device for breaking a horse of cribbing behavior. The device has a member upon which a horse can crib and a circuit including a sensor for detecting when the member is cribbed upon by a horse and a generator which receives the signal from the sensor and in response to the signal applies a shock therapy to the horse. The shock therapy is in the form of an adverse stimuli such as an electrical shock, vibration, noise, light, smell or the like.

8 Claims, 4 Drawing Sheets

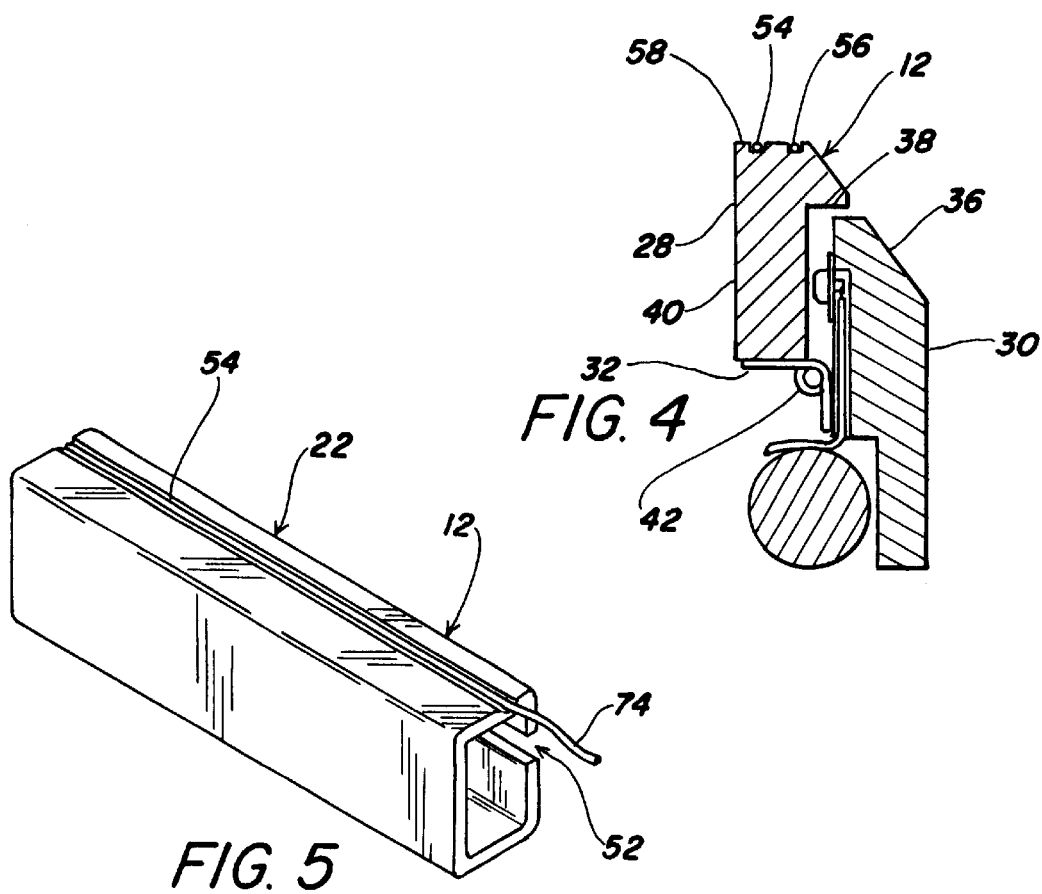
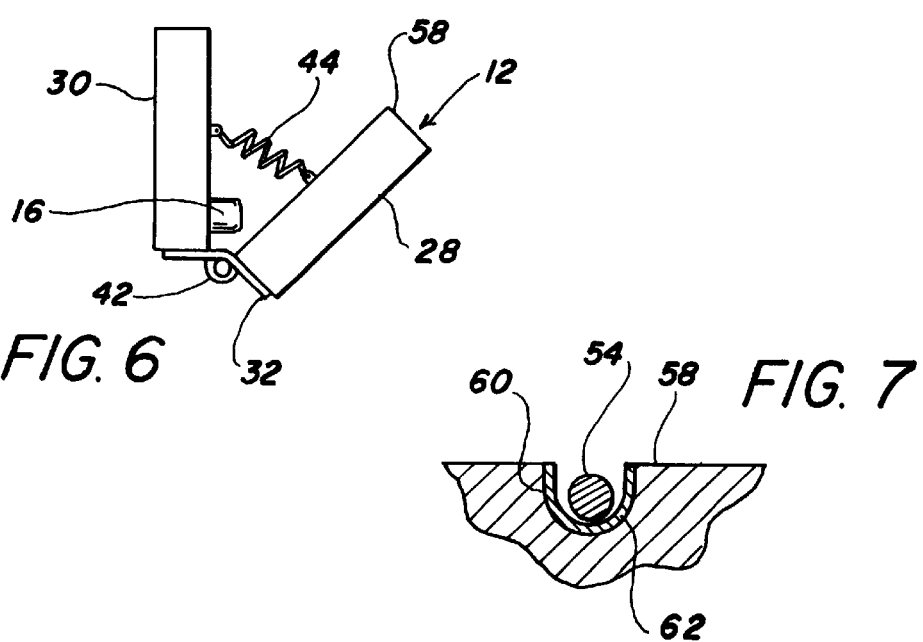

ANTI-CRIBBING DEVICE

This application claims priority from U.S. provisional application serial No. 60/169,565, filed Dec. 8, 1999.

BACKGROUND OF THE INVENTION

1. Field of the Invention

The present invention relates to a device for breaking a horse from cribbing by administering a shock treatment. The device distinguishes other equine activity such that the animal does not receive a shock treatment other than for the activity being discouraged.

2. Brief Description of the Prior Art

Cribbing and wind sucking are disgusting and harmful habits in horses. Cribbing occurs when a horse grabs a stationary object, such as a fence board, stall wall, bunk or the like in its teeth and tears at the gripped member. In extreme cases, a horse may crib up to 3,000 times a day. Cribbing is harmful to the horse's teeth and rough on barns, fences and stalls.

Wind sucking occurs when a horse breathes forcibly through its mouth and gulps air into the digestive tract which can cause colic. A horse with colic has stomach contractions and its intestines may entangle, sometimes with a grave outcome. Cribbing and wind sucking often go together. The cribbing horse having its mouth open can also wind suck, thus combining two bad habits. Because of the dangers in wind sucking, some equine insurance companies will not insure cribbers.

Various ways have been proposed to treat cribbing and wind sucking based on the observation that when a horse cribs or wind sucks, the muscles at the sides of its throat swell causing a distension that results in a larger circumferential dimension around the horse's neck. Straps have been developed to provide an inward pressure on the throat of the horse when it starts to crib or wind suck and electrical shocking devices have been developed that are triggered by the distension of the animal's throat. Pressure straps can choke the horse and may cause sores due to rubbing. Electrical shocking devices have other flaws, including shocking the horse because of some other equine activity that is not cribbing or wind sucking. The devices can also provide prolonged and protracted shocks to the horse if the device does not reset. This is a serious problem as horses are highly sensitive to pain. In addition, both types of devices come into effect well after the activity has started, hence the horse may not associate the choking or shocking with cribbing, with which the process began.

Horses may also be treated for cribbing and wind sucking with antiobsessive-compulsive drugs and surgical treatments, including neurectomy and myotomy.

A need exists for an effective device, which is not harmful to a horse like drugs or surgery, but is effective, unlike cribbing straps that choke or shock, to break a horse of the cribbing habit. It is to this need that the present invention is addressed.

BRIEF SUMMARY OF THE INVENTION

In view of the above, it is an object of the present invention to provide a device that applies a shock treatment to a horse, immediately, when the horse starts to crib. It is another object to provide an anti-cribbing device that is not accidentally triggered by other equine activity. Other objects and features of the invention will be in part apparent and in part pointed out hereinafter.

In accordance with the invention, an anti-cribbing device for horses has a member upon which a horse can crib, a sensor and a generator. The sensor detects when the member is cribbed upon by a horse and sends a signal to the generator. When the generator receives the signal from the sensor, the generator applies a shock therapy to the horse in the form of an adverse stimuli such as an electrical shock, vibration, noise, light, smell or the like.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings, in which several of various possible embodiments of the invention are illustrated, corresponding reference characters refer to corresponding parts throughout the several views of the drawings in which:

FIG. 4 is a cross-section taken along line 4—4 in FIG. 3;

FIG. 5 shows a portion of a second anti-cribbing device in accordance with the present invention;

FIG. 6 shows a portion of a third anti-cribbing device in accordance with the present invention;

FIG. 7 is a detail on an enlarged scale showing an electrical conductor embedded in a top surface of a member on which a horse can crib;

DETAILED DESCRIPTION OF THE INVENTION

Figure 1:
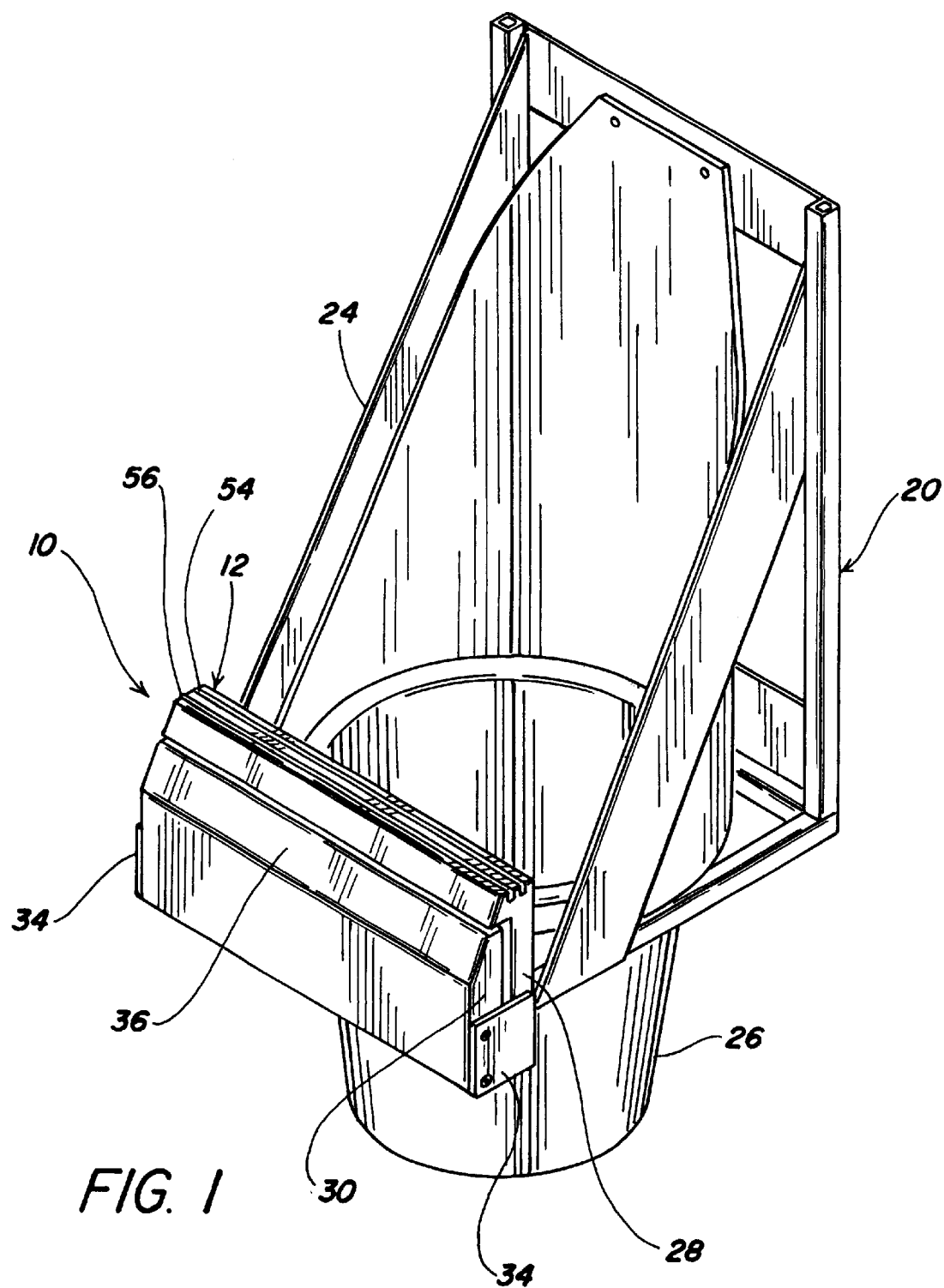
FIG. 1 is a perspective view of an anti-cribbing device in accordance with the present invention shown guarding a bracket for holding a feed bucket.

Referring to the drawings more particularly by reference character, reference numeral 10 identifies an anti-cribbing device in accordance with the present invention. In major part, device 10 includes a member 12 upon which a horse can crib and a circuit 14 including a sensor 16 for detecting when member 12 is cribbed upon by a horse and a generator 18 which receives the signal from sensor 16 and in response to the signal applies a shock therapy to the horse.

Cribbing occurs when a horse takes the edge of a manger 20 (FIG. 1), fence rail 22 (FIG. 5) or some other projection such as the side of a trailer to which it may be tethered between its teeth and tears at the gripped member. The tearing motion is in a direction towards the horse, usually with an upward component. Cribbing is bad for the horse's teeth and can be destructive to the member that is cribbed upon. The action of cribbing apparently pleasures the horse and unless stopped may be repeated over and over and taught to other horses who may observe the activity.

In animal training, it is believed that the more quickly a punishing shock is applied to an animal after an activity that is to be discouraged occurs, the sooner the habit will be counteracted and broken. Device 10 is highly effective for that purpose. Although the drawings illustrate the shock therapy as being administered in the form of an electrical shock, those skilled in the art will appreciate that sensor 16 provides a control signal to generator 18 that can be used to administer different types of shock therapy. The control signal from sensor 16 can be used, for example to control application of a vibration, auditory, visual, olfactory or other adverse stimulus in response to the cribbing activity, by appropriate selection of generator 18.

Figure 2:
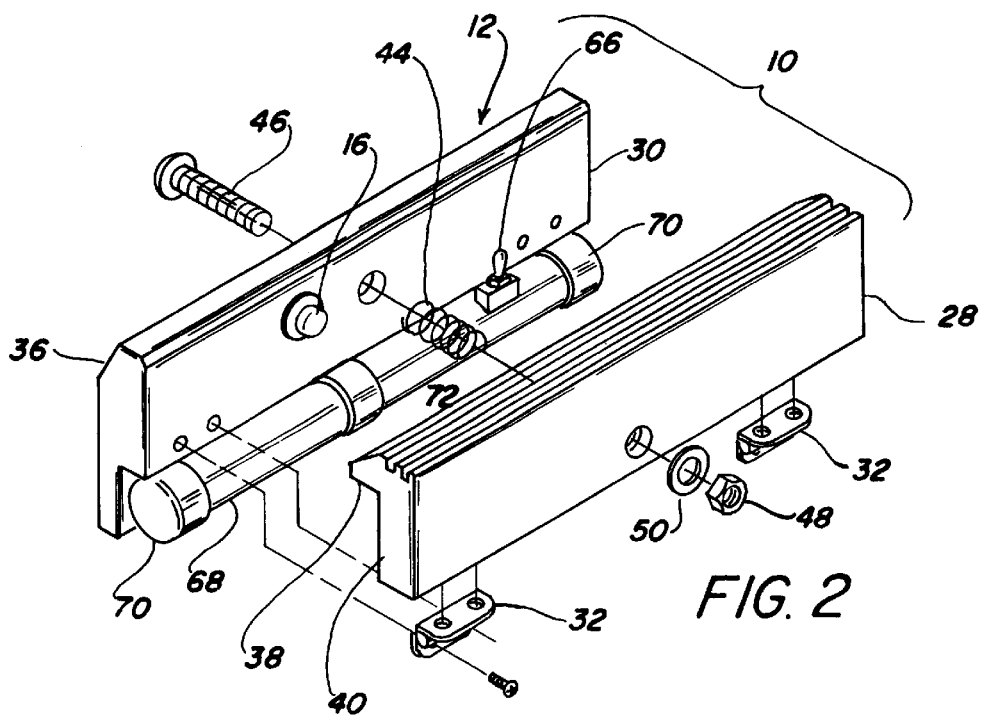
FIG. 2 is an exploded perspective view of the anti-cribbing device shown in FIG. 1.
Figure 3:
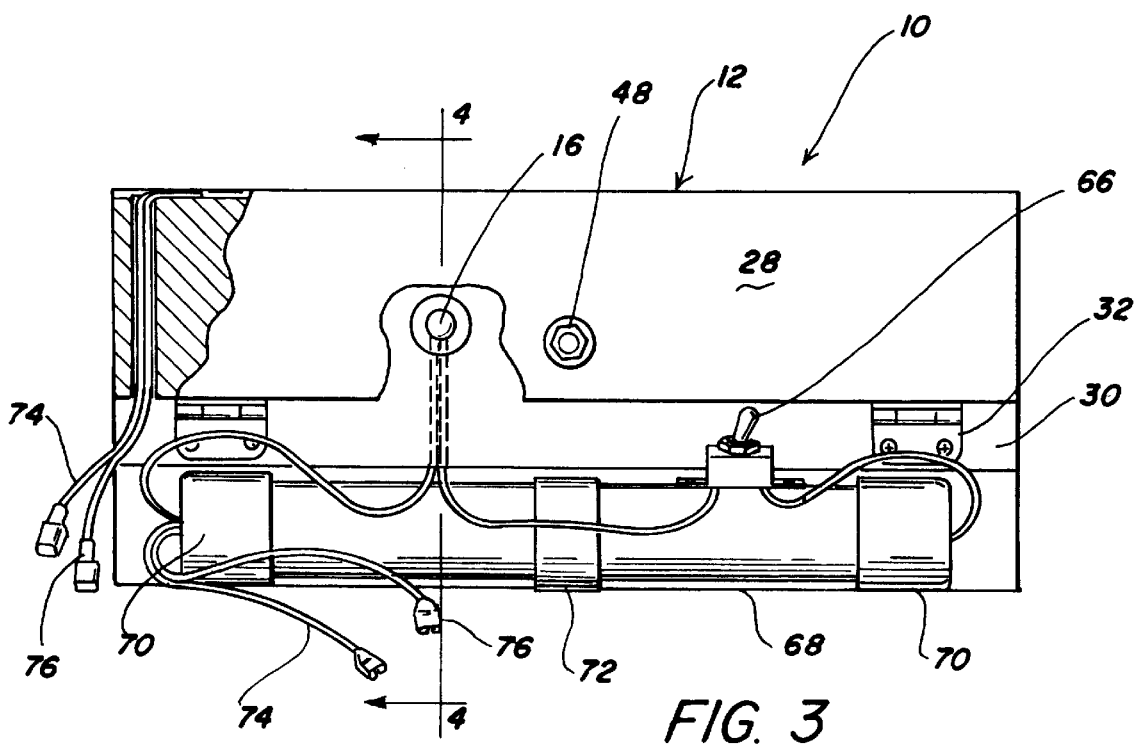
FIG. 3 is rear, assembled view, of the anti-cribbing device with a portion broken away for clarity of illustration.

In the embodiment illustrated in FIGS. 1–3 wherein generator 18 (shown in FIG. 8) applies an electrical shock to a horse, member 12 is attached to a front edge of a bracket 24 for holding a feed bucket 26 in a horse's stall. Member 12 is formed of first and second parts 28, 30, respectively. First part 28 is hinged at 32 to second part 30 along a side edge of second part 30 opposite the side on which a horse is positioned. Second part 30 is stationary, opposite ends of which are held between a pair of arms 34 which are a part of bracket 24.

With continuing reference to FIGS. 1–3, a top edge 36 of second part 30 is beveled such that a horse cannot easily seize second part 30 between his teeth and thus avoid cribbing on first part 28 of member 12. First part 28 is L-shaped in cross-section as shown in FIG. 4 and is pivoted to second part 30 such that a shorter leg 38 of first part 28 swings over the top of second part 30 when first part 28 is cribbed upon by a horse. A leading edge of shorter leg 38 is also beveled as shown in FIG. 4. In a starting position, second part 28 and a longer leg 40 of first part 28 are substantially parallel and spaced apart a distance generally equal to a knuckle 42 of hinge 32. A spring 44 is provided between first and second parts 28, 30. In the form illustrated, spring 44 is a coil spring and is threaded on a bolt 46 which is passed through first and second parts 28, 30 and secured with a nut 48 and washer 50. It will be understood that other spring biasing members including bumpers or the like may be used to the same end. The cribbing force necessary to cause first part 28 to pivot on second part 30 is determined by the strength of spring 44 or such other spring biasing member as may be used. Typically, it should take between about 2 and 20 pounds of force to compress spring 44 and pivot first part 28 on second part 30. This force may be appropriately matched to the horse being broken of cribbing.

First and second parts 28, 30 and the function of spring 44 may be reversed as shown in FIG. 6. As shown in this drawing, first part 28, while still hinged at 32 to second part 30, is closest to the horse and spring 44 is stretched, not compressed, when first part 28 is cribbed upon. As before, however, spring 44 returns first and second parts 28, 30 to a generally parallel, starting position. Turning to FIG. 5, it is seen that member 12 may be formed as a square tube with a slit 52 along a sidewall. When member 12 is rail 22 as shown in FIG. 5 and is cribbed upon, slit 52 opens if the horse is on a side opposite slit 52 or closes if the horse is on the same side as the slit, which movements can be detected by a sensor (not shown in FIG. 5) analogous to sensor 16.

In the embodiment shown in FIGS. 1–3, member 12 has first and second electrical conductors 54, 56 (shown in FIG. 4) within reach of a horse when it cribs. Electrical conductors 54, 56 are spaced apart and are generally parallel to each other, running along a top edge 58 (shown in FIG. 4) of first part 28. While conductors 54, 56 are illustrated on top edge 58, one or both of them may be positioned on a front or rear edge as long as a horse's mouth is likely to bridge the conductors when member 12 is cribbed upon. Conductors 54, 56 may be received in grooves 60 (shown in FIG. 7) or be completely embedded within member 12. When member 12 is formed of an electrically insulating material, staples or other fasteners (not shown) may be used to secure conductors 54, 56 in grooves 60. When member 12 is formed of an electrically conductive or partially conductive material, it may be necessary to line grooves 60 as shown in FIG. 7 with an insulative liner 62. In the embodiment shown in FIG. 5, member 12 has only one conductor 54 for use as more particularly described below.

Figure 8:
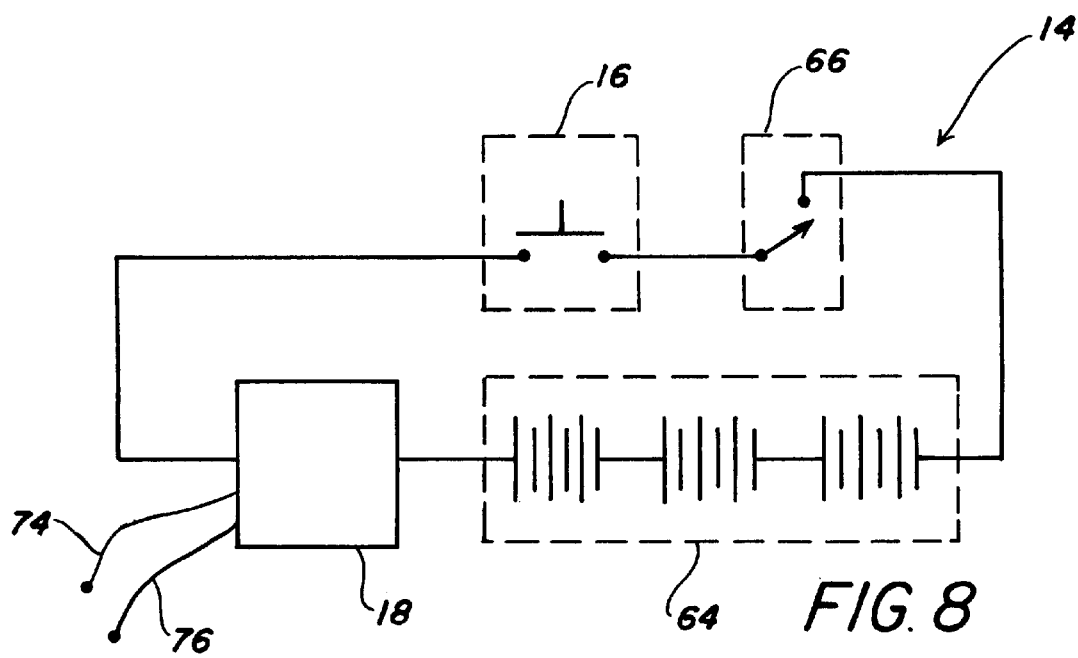
FIG. 8 is a schematic of a circuit for operating an anti-cribbing device.

Circuit 14 in FIG. 8 for operating device 10 as shown in FIGS. 1–3, includes a power source 64 shown as a battery pack, an on-off switch 66, sensor 16 shown as a momentary switch and generator 18 such as found on a stock or cattle prod. Battery pack 64 and generator 18 (shown schematically in FIG. 8) are housed in a tube 68 (shown in FIGS. 2—3) which is capped 70 at both ends. Tube 68 may be attached near the bottom edge of second part 30 below hinges 32 with a suitable clamp 72. On-off switch 66 is provided on the outside of tube 68 and sensor 16 is positioned between first and second parts 28, 30 of member 12. Generator 18 steps up the voltage received from battery pack 64 and provides a low power, high voltage charge to leads 74, 76. There is a voltage difference between leads 74, 76 which may be of opposite polarity. Typically an oscillator is included in generator 18 for reversing the polarity of leads 74, 76 from time to time. As illustrated in the drawings, momentary switch which serves as sensor 16 is of the kind that closes circuit 14 when it is depressed. This occurs when first part 28 pivots on second part 28 as member 12 is cribbed upon by a horse. There is a spring return that opens circuit 14 when pressure on sensor 16 is released. In the embodiment shown in FIG. 6, momentary switch serving as sensor 16 works in an opposite manner. When sensor 16 is depressed, circuit 14 is open, but when first part 28 is cribbed upon and spring stretched, the momentary switch is released to close circuit 14. It will be apparent that sensor 16 may be a mercury switch, photocell, etc., whose selection may be expedient.

In the embodiment shown in FIGS. 1–3 and 6, when on-off switch 66 is closed and sensor 16 triggered by a horse cribbing on member 12, sensor 16 sends a signal to generator 18 which outputs a charge on leads 74, 76. Leads 74, 76 are in electrical communication with conductors 54, 56, which apply a shock to the horse as it cribs upon member 12. When the horse releases member 12, the shock stops. Many horses can be broken of cribbing after a few experiences with device 10 since the punishing shock is immediate and uniquely associated with cribbing and stops when cribbing stops. Other equine activity, such as bumping into member 12 or reaching into feed bucket 26 (FIG. 1) or over rail 22 (FIG. 5) does not trigger sensor 16 which is triggered only if member 12 is bit upon and pulled in a motion towards the horse.

Figure 9:
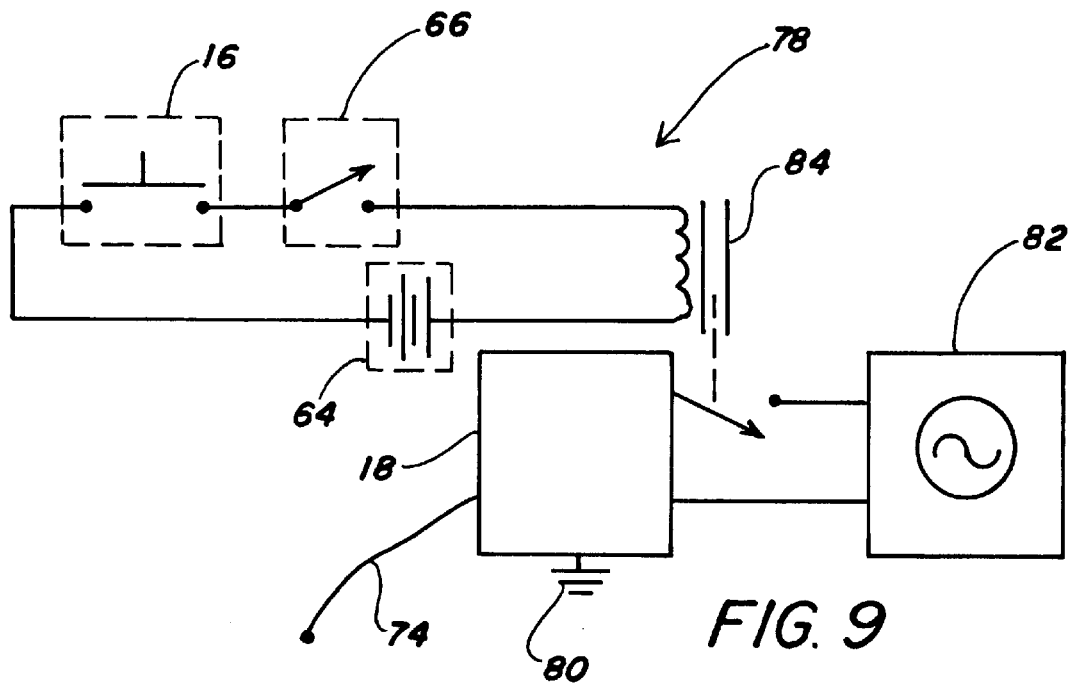
FIG. 9 is a schematic of a second circuit for operating an anti-cribbing device.

Circuit 14 as shown in FIG. 8 is a "wire return" circuit. A horse must touch both conductors 54, 56 to receive a shock. This arrangement is typical of a cattle or stock prod as a user carrying the prod does not want to serve as a ground. An electric fence, however, is an example of an "earth return" circuit 78 which may also be used in the present invention. Circuit 78 as shown in FIG. 9 includes on-off switch 66, sensor 16, power source 64 and generator 18. In this instance, however, generator 18 is grounded at 80 and a charge is supplied to only one lead 74. Lead 74 is connected to conductor 54 on member 12 as shown in FIG. 5. A shock travel's through the horse's body when it touches single conductor 54 and cribs on member 12. Circuit 78 also illustrates that a power source 82 for generator 18 need not be the same power source 64 that permits sensor 16 to signal the generator. Power source 82 may be public mains as shown in the drawing, a solar cell or the like. In similar manner, power source 64 may take other forms including those mentioned in connection with power source 82. In circuit 78, a conventional relay switch 84 or some other functionally equivalent component may be used to switch on generator 18 in response to a signal from sensor 16.

In use, member 12 is provided as a guard on an object that a horse may crib upon, such as bracket 24 for holding feed bucket 26 as shown in FIG. 1. In other instances, member 12 may be provided as a rail in a fence or pen enclosure, in which case first and second parts 28, 30 as shown in FIG. 2 are of indeterminate length or provided in sections linked end-to-end, as may be member 12 in FIG. 5. When a horse cribs upon member 12, member 12 pivots (FIGS. 1–3 and 6) or deforms (FIG. 5) which action is sensed by sensor 16. Sensor 16 signals generator 18 which applies a shock therapy to the horse, startling the animal and discouraging it from cribbing. Once a horse has learned not to crib in a given environment, he may not crib on any structure even if he is removed from the stall with device 10. If a horse merely rubs on device 10 or backs into it, on the other hand, he will not be shocked as sensor 16 will not be triggered. This is important as the purpose of device 10 is to associate the act of cribbing with the shock therapy, not with the act of rubbing on device 10, reaching into feed bucket 26 or the like.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. An anti-cribbing device for horses comprising a member which pivots towards a horse when cribbed upon, a sensor for detecting when the member is cribbed upon by a horse, said sensor sending a signal, and a generator, said generator receiving the signal from the sensor and in response to said signal applying a shock therapy to the horse.

2. The device of claim 1 wherein the generator applies an electrical shock to the horse.

3. The device of claim 1 wherein the generator applies a non-electrical shock to the horse.

4. An anti-cribbing device for horses comprising
   a member which pivots towards a horse when cribbed upon, said member having an electrical conductor within reach of the horse when it cribs on the member and a circuit providing an electrical shock to the horse, said circuit comprising
   a sensor for detecting when the member is cribbed upon by a horse, said sensor sending a signal,
   a generator receiving the signal from the sensor and in response to said signal providing a high voltage, low power charge to the electrical conductor.

5. The device of claim 4 wherein the member has a pair of spaced apart electrical conductors within reach of the horse when it cribs on the member, said generator providing low power charges of different voltages to each of said electrical conductors at any given instant of time while said generator is activated by the signal.

6. An anti-cribbing device for horses comprising
   a first member in a starting position upon which a horse can crib, said first member pivoted towards the horse when cribbed upon and having a pair of spaced apart electrical conductors within reach of the horse when it cribs on the first member and a circuit providing a shock to the horse through the electrical conductors when it cribs on the first member, said circuit comprising:
   a sensor which is triggered when the first member is cribbed upon by a horse and pivoted towards the horse, said sensor sending a signal,
   a power source, and
   a generator, said generator receiving the signal from the sensor and in response to said signal providing a high voltage, low power charge of opposite polarity at any gives instant of time to said electrical conductors while said generator is signaled by the sensor.

7. The device of claim 6 with a spring in contact with the first member for returning it the starting position when a horse is not cribbing on the first member.

8. The device of claim 6 wherein the first member pivots on a second member, said spring between the first and second members for returning the first member to the starting position when a horse is not cribbing on the first member.

* * * * *